United States Patent [19]

Osanai et al.

[11] 4,358,807
[45] * Nov. 9, 1982

[54] TAPE CASSETTE

[75] Inventors: Akira Osanai; Toshihisa Nakao, both of Hachioji, Japan

[73] Assignee: Olympus Optical Company Limited, Tokyo, Japan

[*] Notice: The portion of the term of this patent subsequent to Aug. 25, 1998, has been disclaimed.

[21] Appl. No.: 167,425

[22] Filed: Jul. 11, 1980

Related U.S. Application Data

[63] Continuation of Ser. No. 968,741, Dec. 13, 1978, Pat. No. 4,286,300.

[30] Foreign Application Priority Data

Dec. 13, 1977 [JP] Japan .................................. 52-167361

[51] Int. Cl.³ .................. G11B 15/60; G11B 23/08
[52] U.S. Cl. ............................. 360/130.32; 242/199; 360/130.33; 360/132

[58] Field of Search ............... 360/132, 130.3, 130.31, 360/130.32, 130.33; 297/197–199; 55.19 A

[56] References Cited

U.S. PATENT DOCUMENTS

| | | | |
|---|---|---|---|
| 3,642,220 | 2/1972 | Merry | 242/55.19 A |
| 3,648,941 | 3/1972 | Merry | 360/130.33 |
| 3,951,352 | 4/1976 | Kalmokoff et al. | 242/55.19 A |
| 4,032,987 | 6/1977 | Singer et al. | 360/132 |
| 4,062,506 | 12/1977 | Machida | 360/132 |
| 4,087,845 | 5/1978 | Saito | 360/132 |
| 4,093,967 | 6/1978 | Satov et al. | 360/132 |

*Primary Examiner*—Alfred H. Eddleman
*Attorney, Agent, or Firm*—Toren, McGeady & Stanger

[57] ABSTRACT

In the cassette disclosed, a cassette housing with magnetic tape has openings at the front surface thereof for receiving a magnetic head, a pinch roller and the like. A pair of tape pad springs for pressing against the head of the openings are integrally formed with the housing.

11 Claims, 5 Drawing Figures

4,358,807

TAPE CASSETTE

This is a continuation of application Ser. No. 968,741, filed Dec. 13, 1978, now U.S. Pat. No. 4,286,300.

BACKGROUND OF THE INVENTION

The present invention relates to a tape cassette having improved pad supporting mechanism.

A conventional tape cassette, as shown in FIG. 1, includes a pair of rotatable tape hubs 2 and 3 in a housing 1 divided into upper and lower halves, and containing a magnetic tape 4 wound and fixed to the hubs 2, 3 at both ends. Suitable means serve for guiding the magnetic tape 4 to a tape opening of the housing 1 through guide rollers 5 and 6.

In such tape cassette, a pad spring 7 is arranged at the back portion of the tape 4. Pads 8 on the pad spring 7 is provided with pads 8 press the tape 4 against a head surface with a predetermined pressure when the head is inserted.

Such a tape cassette, therefore, requires a separate pad spring which involves extra parts troublesome assembly and increased cost. Further, as understood from the illustration, the pad spring is short in the effective elastic portion, so that a spring constant becomes large and it becomes difficult to obtain a stable pad effect. To solve this problem, the pad spring itself must have a complicated configuration and the working of a spring is troublesome.

SUMMARY OF THE INVENTION

An object of the present invention is to eliminate the above described disadvantages of the conventional tape cassette.

Another object of the present invention is to provide a tape cassette by forming a pad spring integrally with a cassette housing so as to mitigate costs and to stabilize the pad effect.

According to the present invention a tape cassette comprises a cassette housing, a magnetic tape accommodated therein, openings provided at the front surface of the housing for inserting a magnetic head, a pinch roller and the like, and tape press pad springs integrally formed with the cassette housing.

Each of the pad springs is integrally formed in upper and lower housings, respectively.

The pad spring extends to a head inserting opening around a capstan inserting opening.

DESCRIPTION OF THE PREFERRED EMBODIMENT

Figure 1:
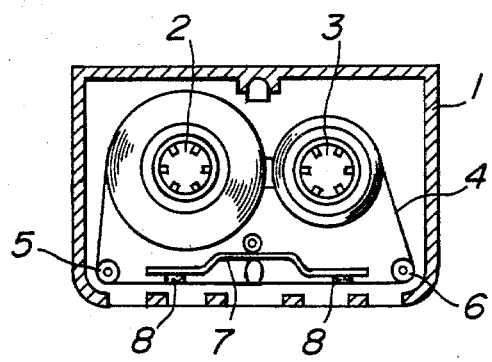
FIG. 1 is a cross-sectional view showing one embodiment of a conventional tape cassette.
Figure 2:
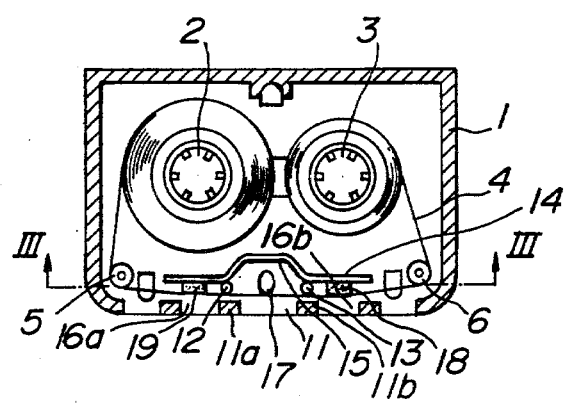
FIG. 2 is a cross-sectional view showing one embodiment of a tape cassette according to the present invention.

Referring now to the drawings, wherein same reference characters designate same or corresponding parts throughout the several views. FIGS. 2 to 5 show tape cassettes according to the present invention and FIG. 1 shows the prior art.

Figure 3:
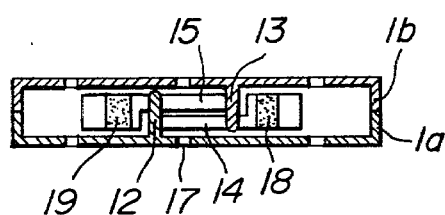
FIG. 3 is a cross-sectional view taken in the direction of an arrow along the line II—II of FIG. 2.
Figure 4:
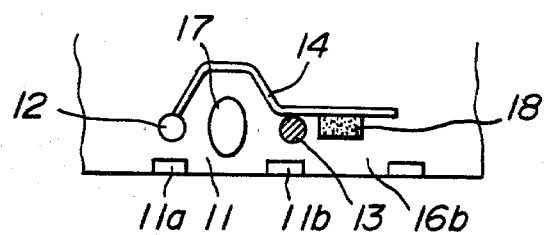
FIG. 4 is an enlarged view showing the essential part of the same embodiment.

In this embodiment, the housing 1 is arranged with pins 12, 13 as bases at back portions of supports 11a, 11b of a pinch roller inserting inlet in a tape opening. The pins 12, 13 are integrally formed with a lower housing 1a and an upper housing 1b, respectively, as shown in FIG. 3. The pins 12, 13 are also integrally formed with pad springs 14, 15, respectively. The pad springs 14, 15, as shown in FIG. 3, are narrow and extend along the tape opening of the housing 1 and to head inserting inlets 16a, 16b on the opposite side of the opening. Each pad spring 14 and 15 is bent around a capstan inserting hole 17 as shown in FIG. 4 for the spring 14, so as to make a long effective elastic portion. The springs produce biasing forces towards the outside of the head inserting inlets 16a, 16b and against the corresponding pins 13, 14 which are used as stoppers.

The ends of the pad springs 14, 15 carry pads 18, 19.

The rest is same as that shown in FIG. 1 so that its explanation is omitted.

According to a tape cassette embodying the invention, each pad spring is integrally formed with the housing, so tha the number of parts can be reduced, thereby simplifying its assemblying and reducing the costs. The pad spring in this embodiment is extended to the head inserting inlet on the opposite side around the capstan inserting hole to produce a long effective elastic portion, so that as compared with a conventional pad spring having a complicated configuration, a spring constant can be made small with a simple configuration and a stable pad effect can be obtained. Further, the pin provided with a pad spring acts as a stopper of the pad spring and a guide for the tape, so that the pad spring can be set at the best pad position, and at the same time, it is possible to omit any special pin or the like for guiding a tape guide. This is economically advantageous.

Figure 5:
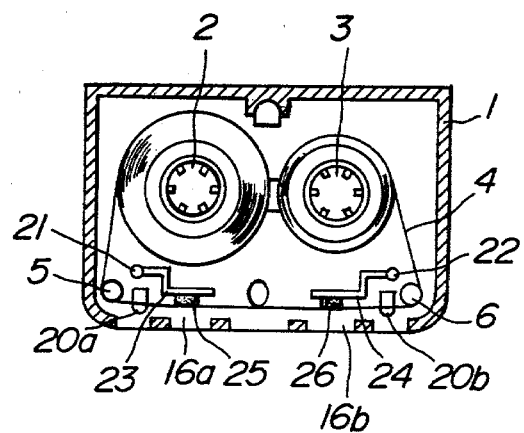
FIG. 5 is a cross-sectional view showing another embodiment of the tape cassette according to the present invention.

In addition, the present invention is not limited to the above embodiment but can be modified without departing therefrom. For instance, as shown in FIG. 5, pins 21, 22 are formed near cassette guide holes 20a, 20b of the housing 1, these pins 21, 22 are integrally formed with pad springs 23, 24 arranged along the guide holes 20a, 20b, and to these springs 23, 24 are secured pads 25, 26, respectively.

As described above, according to the present invention, the pad spring is integrally formed with the cassette housing, so that the costs are mitigated and the pad effect is stabilized.

What is claimed is:

1. A tape cassette, comprising a cassette housing having upper and lower portions and a front edge, a magnetic tape accommodated therein, a pair of openings provided at the front edge of the housing for receiving a magnetic head, an opening for a pinch roller, and a pair of tape press pad springs integrally formed with the cassette housing.

2. A tape cassette as claimed in claim 1, wherein each of the pad springs is integrally formed in upper and lower portions of the housings, respectively.

3. A tape cassette as claimed in claims 1 or 2, wherein each pad spring extends to a head receiving opening around a capstan opening.

4. A tape cassettte, comprising a cassette housing having upper and lower portions and a front edge, a pair of tape hubs rotatably mounted in the housing, a magnetic tape mounted on the hubs, means for guiding the tape from one hub to the other, said housing forming a pair of magnetic head receiving openings straddling the center of the edge, said housing forming an opening for a pinch roller between the magnetic head receiving openings, and a pair of tape press pad springs integrally formed with the cassette housing and extending to the head receiving openings.

5. A cassette as in claims 1, 2 or 4, further comprising a pair of stoppers near the head receiving openings, the springs being biased outwardly toward the edge against said stoppers.

6. A cassette as in claims 1 or 2, wherein the housing forms a capstan opening at the front edge between two head receiving openings, one of said pad springs extending from a point more remote from the capstan opening than one of the head receiving openings and forming a cantilever arm toward one of the head receiving openings, the other of said pad springs extending from a point more remote from the capstan opening than the other of the head receiving openings as a cantilever toward the other of the head receiving openings.

7. A cassette as in claim 6, wherein each of said pad springs has a pad mounted thereon closer to the head receiving portion than the other end thereof and is anchored at the other end thereof, the anchored end of said pad springs being more remote from the edge having the head receiving openings than the ends having the pads.

8. A cassette as in claim 7, wherein said pad springs are step-shaped.

9. A cassette as in claim 8, wherein each of said pads has two portions substantially parallel to the edge having the head receiving openings and one portion substantially perpendicular to the front edge.

10. A cassette as in claims 1, 2 or 4, wherein one of said pad springs extends from one side of the capstan opening and around the capstan opening to the head receiving opening at the outer side thereof, and the other of said pad springs extending from the other side of the capstan opening and around the capstan opening to the head receiving opening at the one side thereof, said pad springs each being arch-shaped and having an extension member from the arch-shaped extending parallel to the front edge.

11. A cassette as in claims 1, 2 or 4, wherein each of said springs form an arch shape and has an extension member extending from the arch shape parallel to the front edge, said springs having pads mounted thereon at the extension and being anchored at the other ends thereof.

* * * * *